United States Patent Office 2,754,305
Patented July 10, 1956

2,754,305
NON-YELLOWING TRIETHANOLAMINE SOAPS

Werner Wolff, Neuotting, Upper Bavaria, Germany, assignor to Farbwerke Hoechst Aktiengesellschaft vormals Meister Lucius & Bruning, Frankfurt am Main Hochst, Germany, a German company No Drawing. Application January 15, 1952, Serial No. 266,600

Claims priority, application Germany January 30, 1951

6 Claims. (Cl. 260—404)

It is known that triethanolamine soaps which are widely used in industry, particularly in the soap industry, have the unpleasant property of turning brown when exposed to the air, thus rendering questionable their practical application. Thus, in fact, the customary shaving soaps are generally based on potassium soaps, in spite of the greater physiological indifference of triethanolamine soaps which would appear to make them pre-eminently suitable for this purpose.

According to the present invention non-yellowing triethanolamine soaps are obtained by subjected triethanolamine to a pre-treatment with sulphurous acid or an agent splitting off sulphurous acid, prior to its saponification. By this means the crude or chemically pure triethanolamine to be saponified is first converted, wholly or partially, into a sulphur dioxide addition product, presumably the sulphite. Accordingly, sulphur dioxide is introduced into the triethanolamine and is readily absorbed on slight heating, until the desired increase in weight is achieved. Increases in weight of up to 54% have been observed. Normally, an increase in weight of 7–8% is sufficient in order to obtain, after subsequent neutralisation, for instance with stearic acid, a triethanolamine stearate which may be kept in storage for many weeks without turning yellow. For some purposes, however, an increase in weight of even about 2% is sufficient.

The neutralisation of the pre-treated triethanolamine with stearic acid is effected by a simple mixing with the prefused stearic acid. Under these conditions, no generation sulphur dioxide takes place. If, however, the mixture is heated to 70° C. within 60 minutes, a liberation of the initially absorbed sulphur dioxide may be observed. An elementary analysis of the stearate then shows a final sulphur content of about 1.58%. This stearate, too, is stable to light and air.

In the production of the stearate, it is not necessary to take into account the sulphur dioxide content when determining the amount of fatty acid. The amount of fatty acid is, as customary, based on the amount of triethanolamine originally used in the process.

The following examples are given to illustrate the invention, the parts being by weight:

Example 1

Into 300 parts of technical triethanolamine 160 parts of sulphur dioxide are introduced within 60 minutes, bringing about an increase in weight of 54%. Subsequently, air is passed through the composition for a short time, in order to remove the excess sulphur dioxide. In this manner, a slightly yellowish, viscous liquid is formed with a very faint $SO_2$ odour.

Into the reaction product thus obtained, 560 parts of fused stearic acid are introduced within 15 minutes while taking care that the temperature of the composition remains above its solidification point. After stirring for a short time the mass is poured into moulds. An almost entirely white, non-yellowing triethanolamine stearate is obtained.

Example 2

50 parts of a triethanolamine-stearate containing 18% of sulphur dioxide are mixed with 110 parts of fused stearic acid and heated to 70° C. for 60 minutes. During this time, the sulphur dioxide escapes in the form of gas. 145 parts of an almost white soap are obtained, with a sulphur content of 1.58%.

Example 3

70 parts of oleic acid are mixed with 38 parts of an 8% sulphur dioxide-containing triethanolamine in the cold, while stirring, for 30 minutes. An oil is obtained, the colour of which corresponds to that of the oleic acid used, which does not turn yellow, in contrast to a triethanolamine-oleate prepared from a triethanolamine not pre-treated with sulphur dioxide.

Instead of the oleic acid, an equivalent weight of coconut fatty acid, customary in the trade, may be used with the same success.

Example 4

200 parts of a triethanolamine containing 7 parts of $SO_2$ dissolved in 97 parts of triethanolamine are treated with 340 parts of boric acid at a temperature of 70–80° C. while stirring. A triethanolamine borate is formed with the generation of $SO_2$ which is entirely colourless in contrast to that obtained from a triethanolamine not pre-treated with $SO_2$. According to analysis, it contains about 0.8% of S; pH–7.

Example 5

70 parts of triethanolamine are mixed with 30 parts of about a 90% pure phosphoric acid, in the manner prescribed in Example 4. The salt thus obtained is entirely colourless.

Example 6

Triethanolamine-salicylate is prepared by the addition of 138 g. of salicylic acid to 150 g. of triethanolamine with 3% $SO_2$-content, as an almost colourless, highly viscous oil.

Further experiments with acetic acid, phthalic acid, oxalic acid, and the like, show that these salts, too, may be obtained from $SO_2$ pre-treated triethanolamine in a colourless form, without difficulty.

I claim:

1. A process for the manufacture of non-yellowing triethanolamine salts which comprises introducing sulphur dioxide under slight heating into triethanolamine and then neutralizing the so-modified triethanolamine with an acid.

2. A process as claimed in claim 1 wherein a part of the sulphur dioxide introduced into the triethanolamine is removed by heating during the neutralization step.

3. A process as claimed in claim 1 wherein the amount of sulphur dioxide introduced into the triethanolamine increases the weight of the latter from about 2% to about 54%.

4. A process for the manufacture of non-yellowing triethanolamine soaps which comprises introducing sulphur dioxide under slight heating into triethanolamine and then neutralizing the so-modified triethanolamine with a fatty acid.

5. A process as claimed in claim 4 wherein technical, crude triethanolamine is used and the amount of sulphur dioxide introduced into the triethanolamine increases the weight of the latter from about 2% to about 54%.

6. A process as claimed in claim 5 wherein a part of the sulphur dioxide introduced into the triethanolamine is removed by heating during the neutralization step.

References Cited in the file of this patent

UNITED STATES PATENTS

| | | |
|---|---|---|
| 22,593 | Tilghman | Jan. 11, 1859 |
| 1,580,136 | Hamburger et al. | Apr. 13, 1926 |

OTHER REFERENCES

Trusler: Industrial and Eng. Chemistry (July, 1929), pages 685–687.